(12) United States Patent
Nousiainen

(10) Patent No.: US 6,874,926 B2
(45) Date of Patent: Apr. 5, 2005

(54) ILLUMINATION SYSTEM FOR AN ELECTRONIC DEVICE

(75) Inventor: Jaakko Nousiainen, Marttila (FI)

(73) Assignee: Nokia Corporation, Espoo (FI)

( * ) Notice: Subject to any disclaimer, the term of this patent is extended or adjusted under 35 U.S.C. 154(b) by 213 days.

(21) Appl. No.: 09/994,470

(22) Filed: Nov. 26, 2001

(65) Prior Publication Data

US 2003/0099116 A1 May 29, 2003

(51) Int. Cl.$^7$ .............................................. F21V 8/00
(52) U.S. Cl. ......................... 362/559; 362/24; 362/30; 362/88
(58) Field of Search .......................... 362/30, 85, 109, 362/559, 577, 23, 24, 26, 31, 27, 88; 385/50

(56) References Cited

U.S. PATENT DOCUMENTS

| | | | | |
|---|---|---|---|---|
| 5,083,240 A | | 1/1992 | Pasco | 362/26 |
| 5,128,842 A | * | 7/1992 | Kenmochi | 362/31 |
| 5,568,367 A | | 10/1996 | Park | 362/109 |
| 5,711,588 A | * | 1/1998 | Rudisill | 362/30 |
| 6,168,283 B1 | | 1/2001 | Howell | 362/84 |
| 6,367,940 B1 | * | 4/2002 | Parker et al. | 362/29 |
| 6,561,659 B1 | * | 5/2003 | Hsu | 362/24 |
| 6,598,987 B1 | * | 7/2003 | Parikka | 362/26 |

FOREIGN PATENT DOCUMENTS

WO          0123805          4/2001          ............ F21V/8/00

* cited by examiner

Primary Examiner—Thomas M. Sember
Assistant Examiner—Bao Q. Truong
(74) Attorney, Agent, or Firm—Ware, Fressola, Van Der Sluys & Adolphson LLP

(57) ABSTRACT

A light conduit to be used in conjunction with a light source in a hand-held electronic device for illuminating the keys and display of the device. The light conduit has a planar light guiding section with a plurality of light escape elements located in the keys to allow portions of the received light to escape for illuminating the keys. An light escapement section, located near the display, is extended from or optically coupled to the light guiding section to allow a further portion of the received light to escape from the light escapement section for illuminating the display. The light source can be located near the light guide section or near the light escapement section. light guide section or near the light escapement section.

36 Claims, 12 Drawing Sheets

ILLUMINATION SYSTEM FOR AN ELECTRONIC DEVICE

FIELD OF THE INVENTION

The present invention relates generally to an illumination system for illuminating the keys, push buttons or display areas on a hand-held electronic device and, more particularly, to a light guide using total internal reflection to distribute light received from a light source to reach those keys and display areas.

BACKGROUND OF THE INVENTION

Hand-held electronic devices, such as mobile phones, personal digital assistant (PDA) devices and Communicator devices, have an illuminated user-interface so that the user-interface can be viewed and used by a user even when natural lighting is inadequate. One of the most common ways is to use a plurality of light-emitting diodes (LEDs) to separately illuminate different areas of the user interface. The use of multiple LEDs for illumination causes a significant drain on the power source available to the electronic device. In particular, when a lambertian emitting LED is used to illuminate an area of the user interface, only a small fraction of the power provided electrically to the LED actually transfers to the optical power reaching that area. Moreover, guiding this optical power efficiently to the illuminated area is very difficult. In general, the LED illuminates through a range of angles that casts light on a large swath of area near the keypad. As a result, the waste in the electrical power provided to the LEDs is significant. Nousiainen (WO 01/23805 A1) provides a solution to the user-interface illumination problem. As disclosed in Nousiainen, a light guide, based on total internal reflection, is used to distribute light received from a single light source throughout the light guide, and a plurality of step-like surfaces are used to convey portions of the optical power to the illuminated areas via total internal reflection at the step-like surfaces.

While the light guide, as disclosed in Nousianien, provides an efficient way for illuminating a user interface, the thickness of the light guide is reduced every time a step is made to provide the step-like surface and, therefore, the light guide generally becomes thinner and thinner as the illuminated areas are located further and further away from the light source. In an electronic device having many separate illuminated areas, the thickness of the light guide will become very uneven in that some sections of the light guide may be too thick, while the other sections may be too thin. Disposing such a light guide in a small hand-held device may be difficult. Thus, it is advantageous and desirable to provide a light guide wherein the thickness of the light guide does not vary significantly.

SUMMARY OF THE INVENTION

According to the first aspect of the present invention, an illumination system for use in a device having a display and a plurality of key buttons disposed in a plurality of key locations. The illumination system comprises:

a light source for providing light; and a light conduit adapted to receive at least a portion of the provided light, the light conduit having:

a light guiding section for conveying the received light to areas near the key locations, wherein the light guiding section has two substantially flat boundaries for allowing the received light to propagate between the boundaries via reflection, and a plurality of light escape elements disposed in the light guiding section and located in the areas near the key locations to allow portions of the received light to escape from the light guiding section for illuminating the key buttons.

Preferably the light conduit further comprises a light escapement section located near the display and extended from or optically coupled to the light guiding section of the light conduit to allow a further portion of the received light to escape from the light escapement section for illuminating the display.

According to the present invention, the light source is located near the light guiding section so that the portion of the provided light from the light source is received through the light guiding section. Alternatively, the light source is located near the light escapement section so that the portion of the provided light from the light source is received through the light escapement section.

Preferably, the two boundaries are substantially parallel to each other so that the light guiding section has a substantially even thickness. It is possible that the two boundaries are slightly curved so that the light guiding section is slightly bent.

Preferably, the two boundaries are dense-rare boundaries and the reflection between the boundaries is total internal reflection. It is possible that one or both of the boundaries are coated or treated with a material for reflection enhancement.

According to the present invention, the light source comprises at least one light-emitting device such as light-emitting diode (LED), laser diode, Vertical Cavity Surface Emitting Laser (VCSEL), Resonant Cavity LED (RCLED), or other solid-state light-emitter. Furthermore, the light source can also be one or more incandescent lamps, fluorescent lamps, phosphorescent lamps or one with an optical fiber.

According to the present invention, the light escape element comprises at least one reflecting surface different from the two flat boundaries.

Preferably, the light escapement section comprises a step-like structure having a plurality of total internal reflection surfaces to reflect further portions of the received light toward the display.

According to the second aspect of the present invention, a light conduit for use in conjunction with a light source in a device having a display and a plurality of key buttons disposed in a plurality of key locations, and the light conduit is adapted to receive at least a portion of light provided by the light source. The light conduit comprises:

a light guiding section for conveying the received light to areas near the key locations, wherein the light guiding section has two substantially flat boundaries for allowing the received light to propagate between the boundaries via reflection, and a plurality of light escape elements disposed in the light guiding section and located in the areas near the key locations to allow portions of the received light to escape from the light guiding section for illuminating the key buttons.

Preferably, the light conduit also comprises a light escapement section located near the display, and the light escapement section is extended from or optically coupled to the light guiding section to allow a further portion of the received light to escape from the light escapement section for illuminating the display.

According to the third aspect of the present invention, a portable device having a display and a plurality of key buttons disposed in a plurality of key locations. The portable device further comprises:

a light source for providing light; and a light conduit adapted to received at least a portion of the provided light from the light source, the light conduit having:

a light guiding section for conveying the received light to areas near the key locations, wherein the light guiding section has two substantially flat boundaries for allowing the received light to propagate between the boundaries via reflection, and a plurality of light escape elements disposed in the light guiding section and located in the areas near the key locations to allow portions of the received light to escape from the light guiding section for illuminating the key buttons.

Preferably, the light conduit further comprises a light escapement section located near the display and extended from the light guiding section to allow a further portion of the received light to escape from the light escapement section for illuminating the display.

The present invention will become apparent upon reading the description in conjunction with FIGS. 1 to 14.

BRIEF DESCRIPTION OF THE DRAWINGS

FIG. 11b is a side view showing the embodiment of FIG. 11a.

BEST MODE FOR CARRYING OUT THE INVENTION

Figure 1:
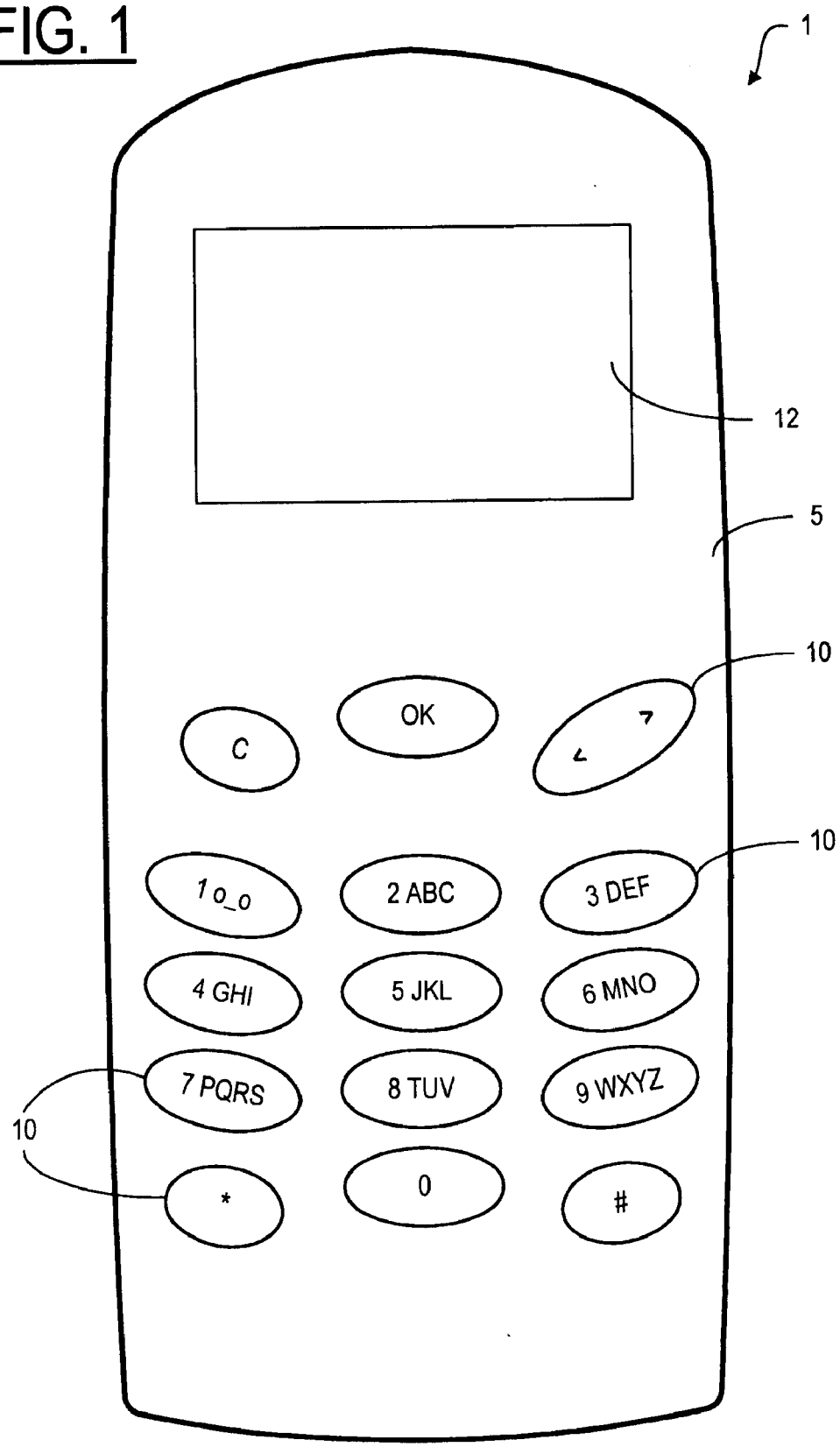
FIG. 1 is a top view showing a mobile phone having a plurality of keys and a display to be illuminated by an illumination system, according to the present invention.
Figure 2:
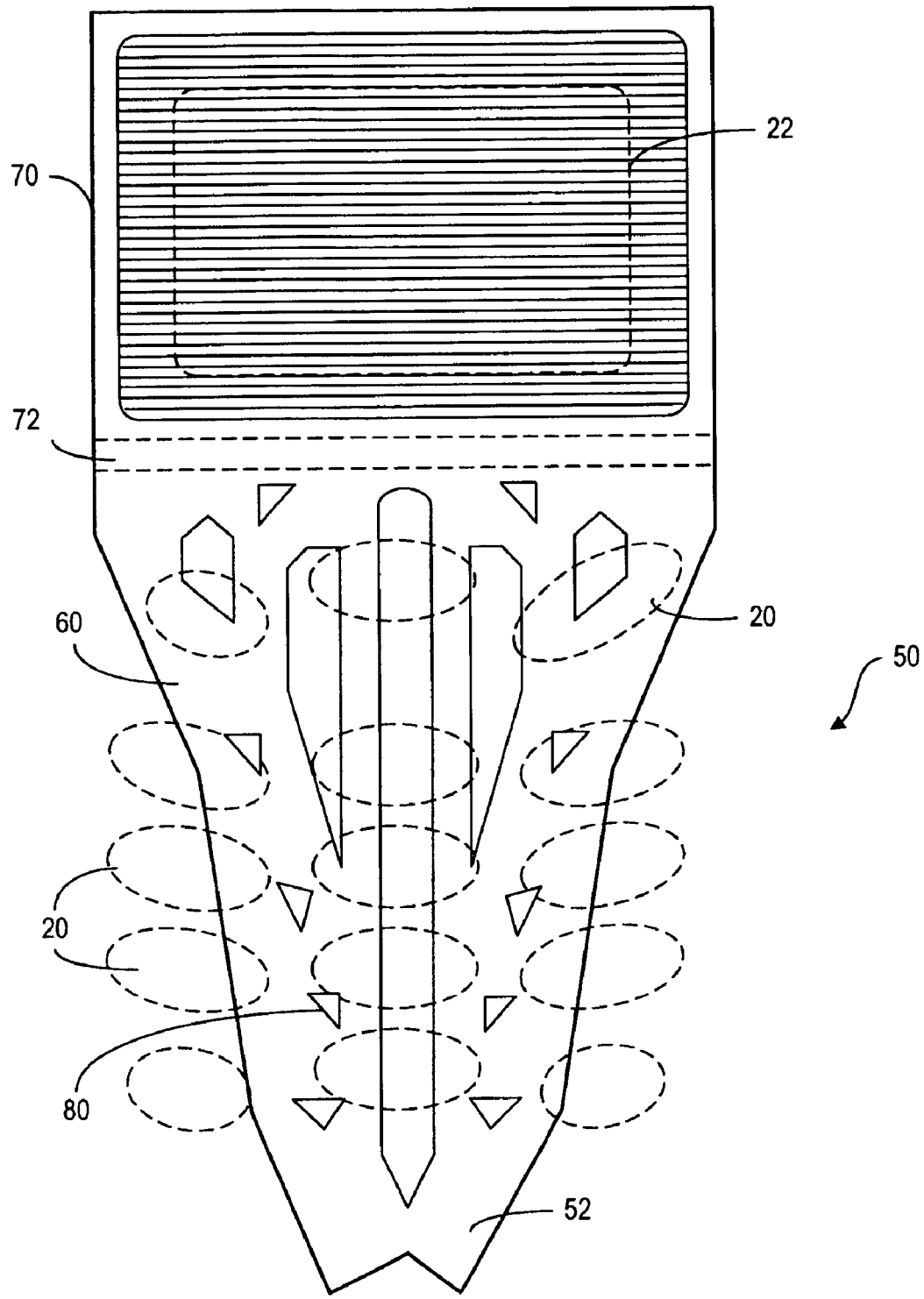
FIG. 2 is a top view showing the preferred embodiment of the light conduit, according to the present invention.
Figure 3:
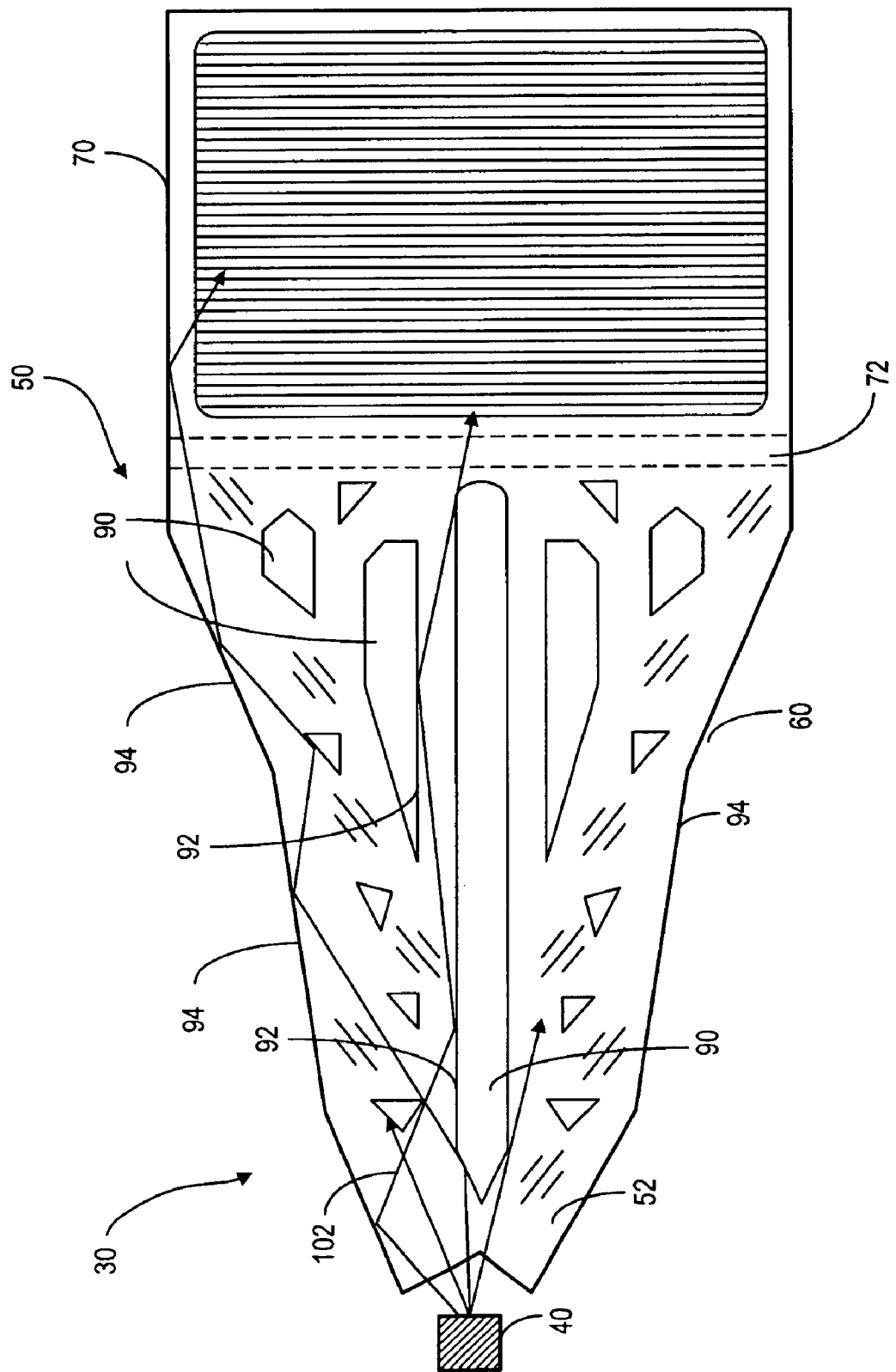
FIG. 3 is a top view showing the preferred embodiment of the illumination system, according to the present invention.

A hand-held electronic device, such as a mobile terminal 1, as shown in FIG. 1, has a cover 5 with a plurality of input keys or key buttons 10 and a display 12. In particular, the display 12 is a liquid-crystal display (LCD). It is preferred that the key buttons 10 and the display 12 be illuminated by an internal light source so that a user can view and use the key buttons 10 and the display 12 even when the natural lighting is inadequate. In order to illuminate the key buttons 10 and the display 12, the present invention uses an illumination system 30 having a light source 40 and a light conduit 50, as shown in FIG. 3. The key buttons 10 are located in a plurality of key locations 20 and the display 12 is located at a display location 22 on the cover 5, in relation to the light conduit 50. The key locations 20 and the display location 22 are shown as dashed lines superimposed on the light conduit 50, as shown in FIG. 2. As shown in FIG. 3, the light conduit 50 has an input 52 for receiving light provided by the light source 40, and a light guiding section 60 extended from the input 52 for guiding the received light. The light conduit 50 also has a plurality of light escape elements 80 located within the light guiding section 60 near the key locations 20 to allow portions of received light to escape from the light guiding section 60 for illuminating the key buttons 10. Preferably, the light conduit 50 also has a light escapement section 70, which is optically coupled to the light guiding section 60 at an optical interface 72. The light escapement section 70 is located at the display location 22 for illuminating the display 12. As shown in FIGS. 4 and 7a to 10, with different optical interfaces 72, the light escapement section 70 can be disposed above or below the display 12.

Figure 4:
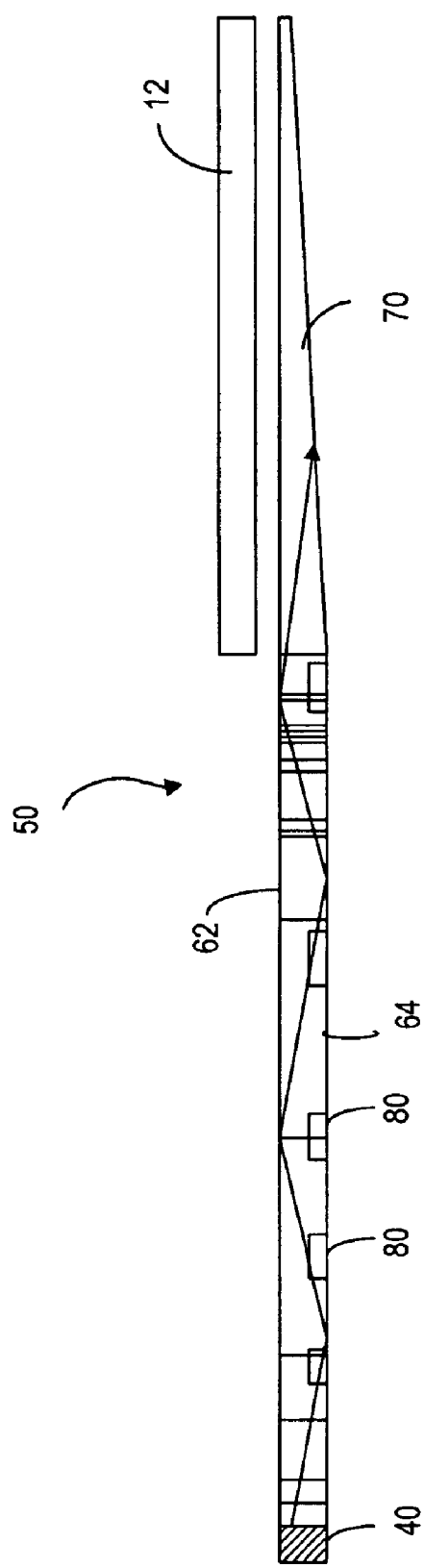
FIG. 4 is a side view showing the preferred embodiment of the illumination system, according to the present invention.

FIGS. 3 and 4 show a top view and a side view of the light conduit 50, according to the preferred embodiment of the present invention. As shown in FIG. 4, the light guiding section 60 is basically an optically transparent plate, bound by a first dense-rare boundary 62 and a second dense-rare boundary 64. As with any planar light guide, light rays 102 received from the light source 40 are guided within the plate via total internal reflection at the dense-rare boundaries 62, 64. As shown in FIG. 4, the dense-rare boundaries 62, 64 are substantially flat and also substantially parallel to each other. However, the dense-rare boundaries 62, 64 are not necessarily parallel to each other. It is possible that the light guiding section 60 is slightly tapered and a small angle exists between these boundaries. Furthermore, the light guiding section 60 can be slightly bent and the dense-rare boundaries 62, 64 are slightly curved (not shown). As shown in FIG. 4, the light escapement section 70 is placed below the display 12 for illuminating the display 12 from the back side thereof (see FIGS. 7a and 7b). It is possible that the light escapement section 70 is an integral part of the light conduit 50 and, effectively, there is no optical interface 72 between the light escapement section 70 and the light guiding section 60. As shown in FIGS. 3 and 4, the light escape elements 80 are multi-facet dents or gaps or one or more microlenses provided on the second dense-rare boundary 64. The depth of the light escape elements 80 is smaller than the thickness of the light guiding section 60. Preferably, the light guiding section 60 has a plurality of apertures 90 to provide a plurality of reflection surfaces 92 to guide the received light 102 further away from the input 52. The received light 102 can also be reflected by the side edges 94 of the light guiding section 60.

Figure 5:
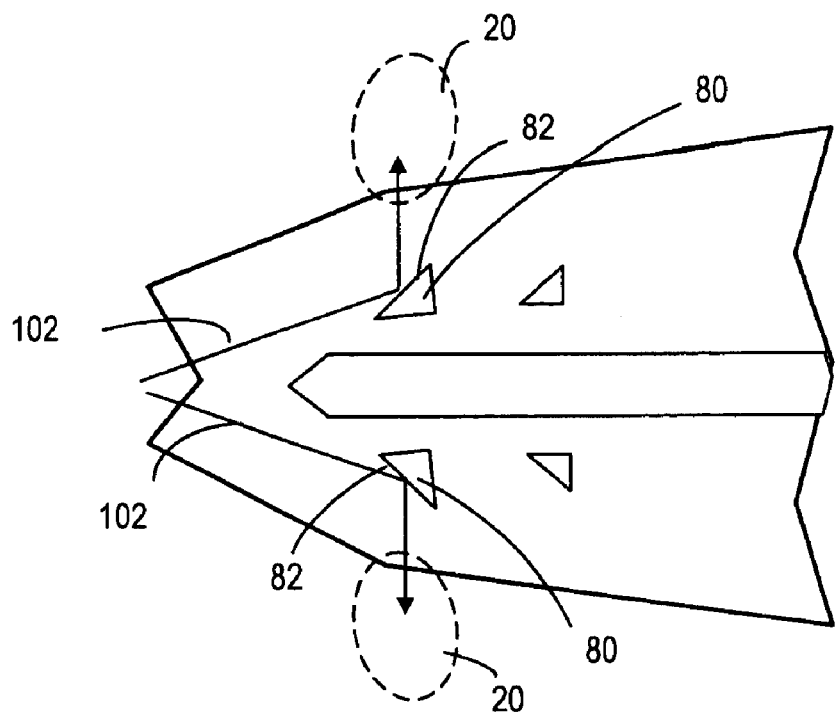
FIG. 5 is a detailed section of the light guiding section showing reflection of light from the light escape elements toward the key locations.
Figure 6:
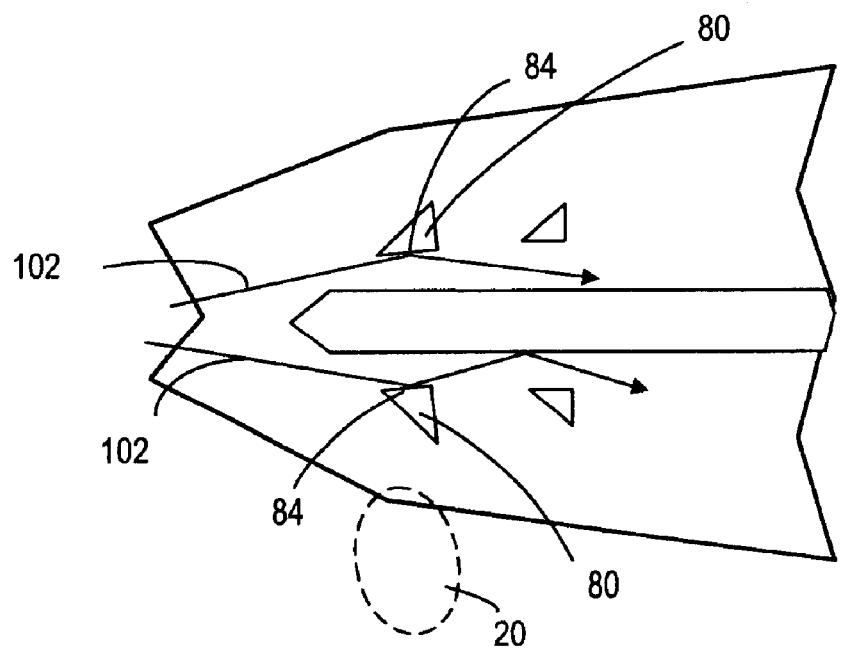
FIG. 6 is a detailed section of the light guiding section showing reflection of light from the light escape elements for guiding light within the light guiding section.

As shown in FIG. 5, the light escape elements 80 are oriented in such a way that some surfaces 82 of the light escape elements 80 are used to reflected portions of the received light 102 toward the key locations 20 via total internal reflection. Other surfaces 84 of the light escape elements 80 can also be used to guide the received light 102 back into the light guiding section 60, as shown in FIG. 6.

Figure 7A:
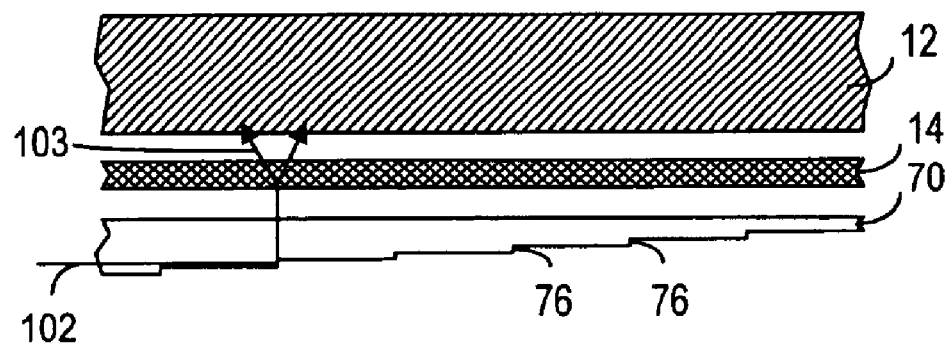
FIG. 7a is a side view showing a light escapement section for illuminating an LCD from the back side thereof.
Figure 7B:
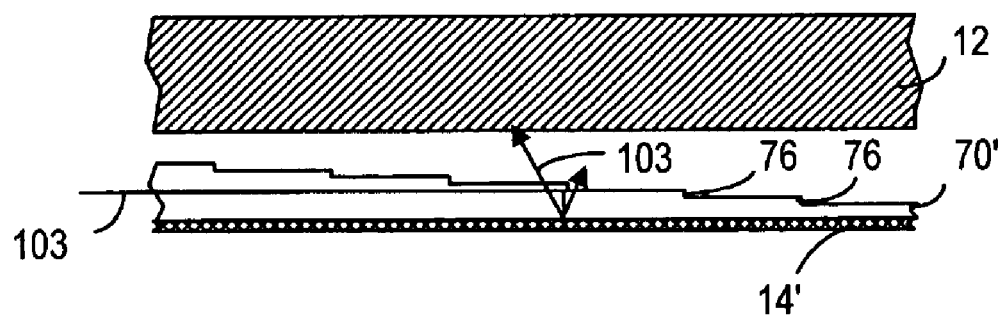
FIG. 7b is a side view showing another light escapement section for illuminating an LCD from the back side thereof.

FIG. 7a shows a detailed section of the light escapement section 70 for illuminating the display 12. As shown, the light escapement section 70 has a step-like structure with a plurality of surfaces 76 to reflect light toward the display 12 via total internal reflection. If necessary, a diffuser 14 can be placed between the display 12 and the light escapement section 70 to even out the illuminating light. With the diffuser 14, the light beam 102 from the light escapement section 70 will become diffuse light 103 for illuminating the display 12. It should be noted that, the light escapement section can be placed in a different orientation as shown in FIG. 7b. As shown in FIG. 7b, the diffuse surface 14' is disposed below the light escapement section 70' and the light beam 102 from the light escapement section 70 is reflected from the surfaces 76 downward towards the diffuse surface 14'. At the diffuse surface 14', diffuse light 103' is formed for illuminating the display 12.

Figure 8:
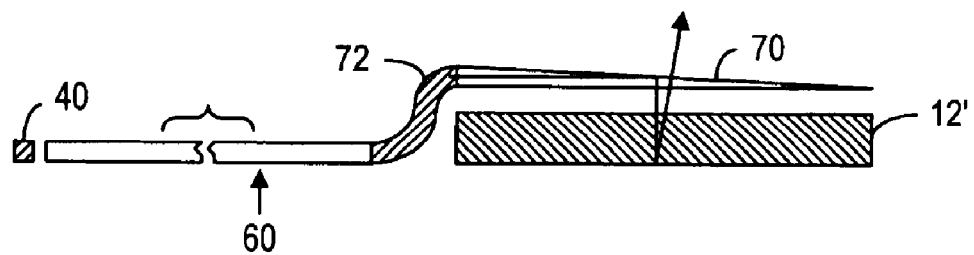
FIG. 8 is a side view showing a light escapement section for illuminating an LCD from the front side thereof.

With a front-light LCD 12', the light escapement section 70 is placed above the display 12', as shown in FIG. 8. In this case, the light escapement section 70 can be integrated with the light guiding section 60. Alternatively, a special optical interface 72 is used to optically couple the light escapement section 70 to the light guiding section 60.

Figure 9:
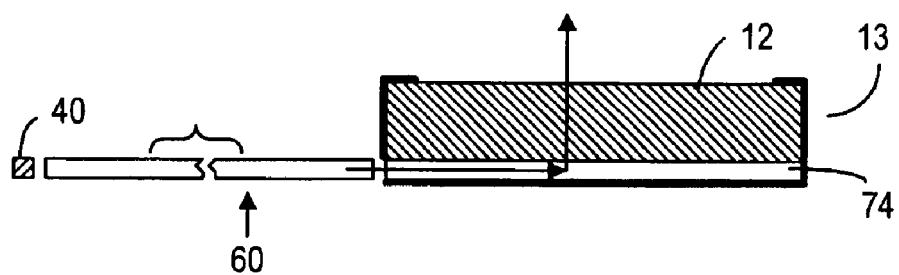
FIG. 9 is a side view showing a light guiding section optically coupled to the internal light guide of a back-light modular LCD.
Figure 10:
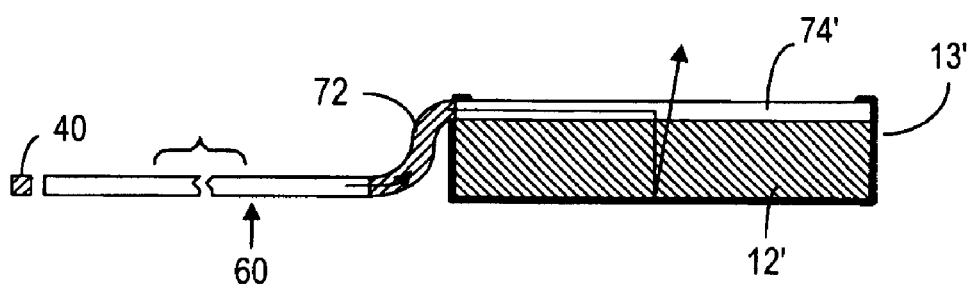
FIG. 10 is a side view showing the light guiding section optically coupled to the internal light guide of a front-light modular LCD.

The light guiding section 60 can also be used in conjunction with a modular LCD, which has a built-in light guide. As shown in FIG. 9, the back-light modular LCD 13 has a built-in light guide 74, it is possible to cut open one side of the modular LCD 13 so as to optically couple the light guide 74 to the light guiding section 60, according to the present invention. As shown in FIG. 10, the front-light modular LCD 13' has a built-in light guide 74', and it is possible to cut open one side of the modular LCD 13' so as to optically couple the light guide 74' to the light guiding section 60 of the present invention via the optical interface 72.

Figure 11A:
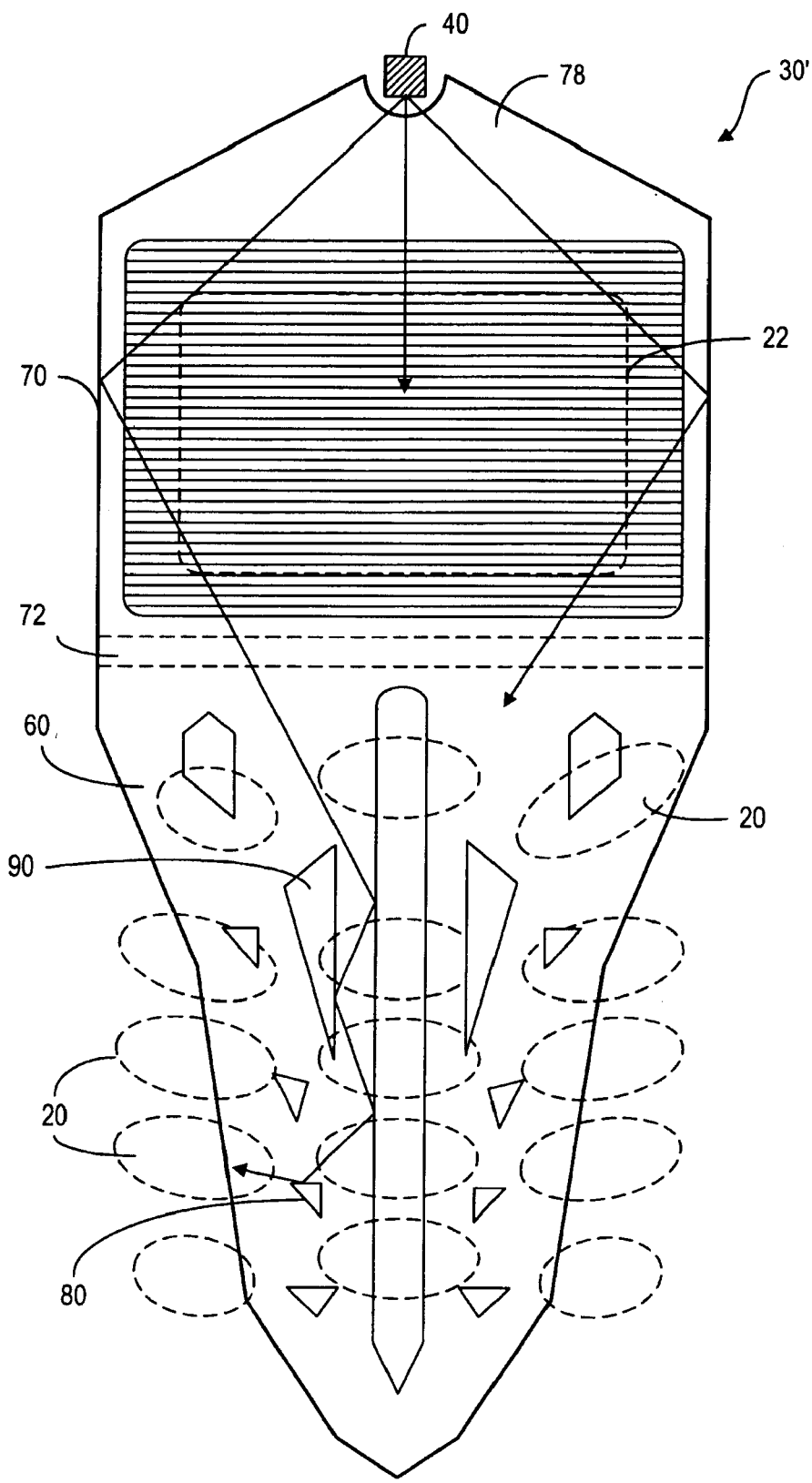
FIG. 11a is a top view showing another embodiment of the illumination system, according to the present invention.
Figure 11B:
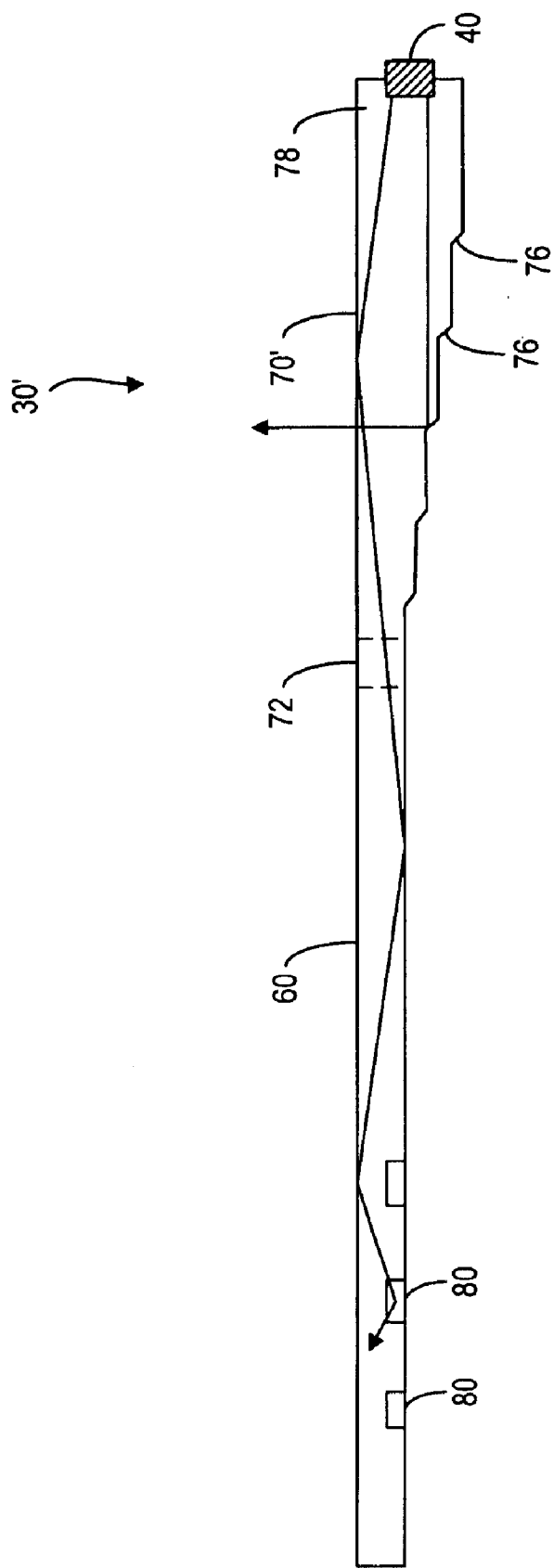
Figure 12:
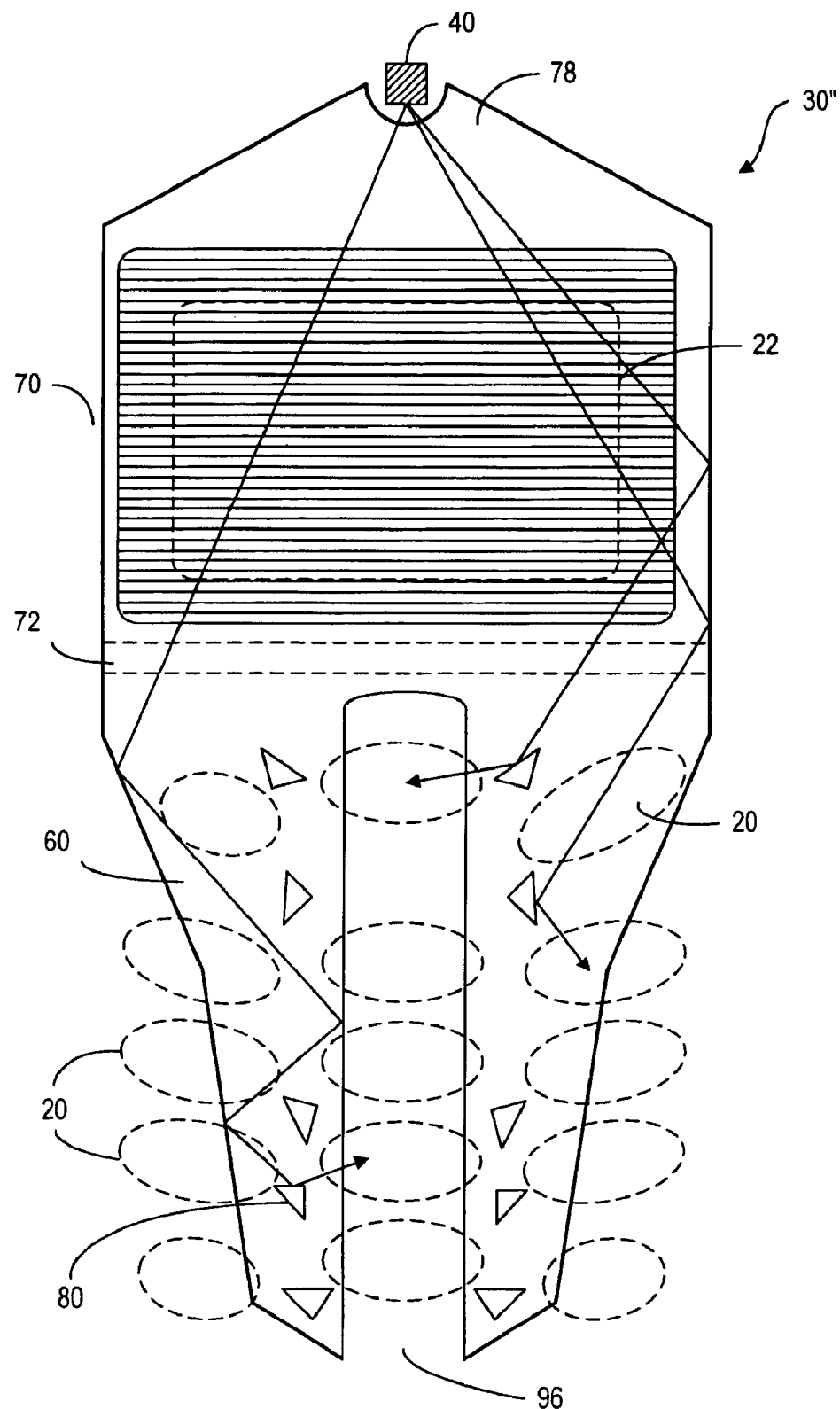
FIG. 12 is a top view showing yet another embodiment of the illumination system, according to the present invention.

FIGS. 11a, 11b and 12 illustrate two different embodiments of the prevent invention. The illumination system 30', as shown in FIG. 11a, is similar to the illumination system 30, as shown in FIG. 3, except that the light source 40 is located near an input end 78 of the light escapement section 70'. Furthermore, the step-like structure of the light escapement section 70', as shown in FIG. 11b, is oriented in a different direction from the step-like structure of the light escapement section 70 as shown in FIGS. 4, 7a and 7b. In FIGS. 7a and 7b, the surfaces 76 for total internal reflection are facing the light guiding section 60. In FIG. 11b, the surfaces 76' for total internal reflection are facing the input end 78, away from the light guiding section 60.

The illumination system 30", as shown in FIG. 12, is similar to the illumination system 30', as shown in FIG. 11a and 11b, except that all of the apertures 90 are not present in the light guiding section 60 and a gap 96 is provided.

The light escape elements 80, as described hereinabove, are multi-facet dents or gaps on the dense-rare boundary 64. These multi-facet dents or gaps can be located on the dense-rare boundary 62. The surfaces 82 and 84, as shown in FIGS. 5 and 6 of the light escape elements 80, can also be used to guide the received light 102 within the light guiding section 60. It should be noted that the light escape elements can be provided on the dense-rare boundaries in different forms. For example, a light escape element can be a small surface area having a random surface to locally destroy the total internal reflection to allow a portion of the received light to escape through this small surface area for illuminating one or more key buttons nearby. Similarly, the light escape element can be a smaller surface area having thereon one or more microlenses, printed dots or a diffractive element to allow a portion of received light to escape therethrough.

Furthermore, the boundaries 62, 64 as described in conjunction with FIG. 4 are dense-rare boundaries for guiding the light by way of total internal reflection. However, these boundaries can be coated or treated with a reflective material so that regular reflection can occur at the boundaries. Likewise, the light escape elements 80 in the light guiding section 60 and the surfaces 76 of the light escapement section 70 can be coated or treated with a material to increase the portions of the received light that escape. The reflection surfaces 92 of the apertures 90 in the light guiding section 60 can also be coated with a reflective material to enhance the reflection therefrom.

The hand-held device 1 in which the light conduit 50, or the illumination system 30, is used has been described as a mobile terminal. It should be noted that the light conduit 50 and the illumination system 30 can also be used in other devices, such as personal data assistant (PDA) devices, or Communicator devices. The device 1 can be portable or otherwise. The device 1 can be an electronic device or an "electronic dummy" device with no useful electronic functions.

Figure 13:
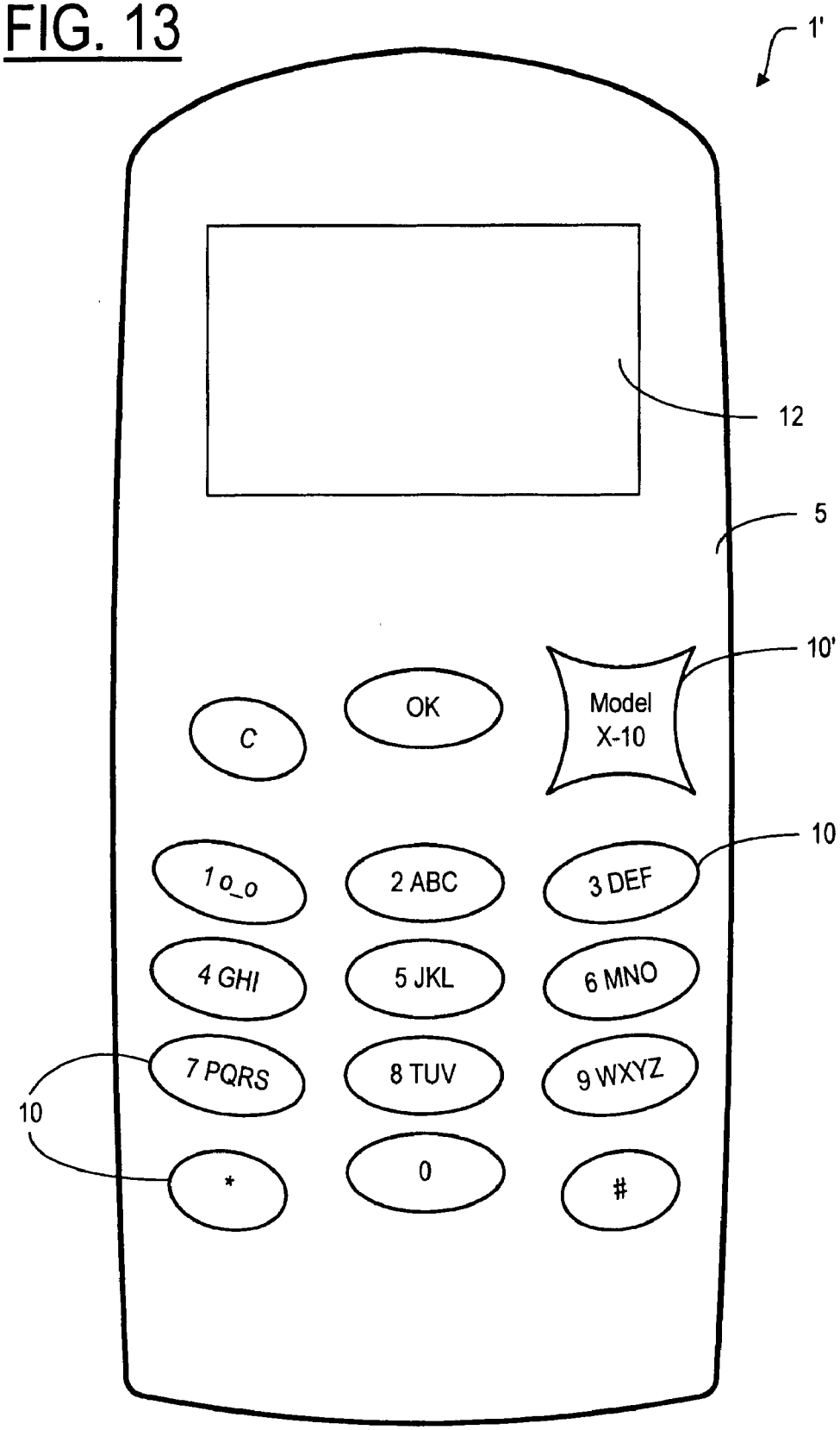
FIG. 13 is a top view showing a mobile phone having a plurality of keys, a display and a decorative parts on the phone cover.
Figure 14:
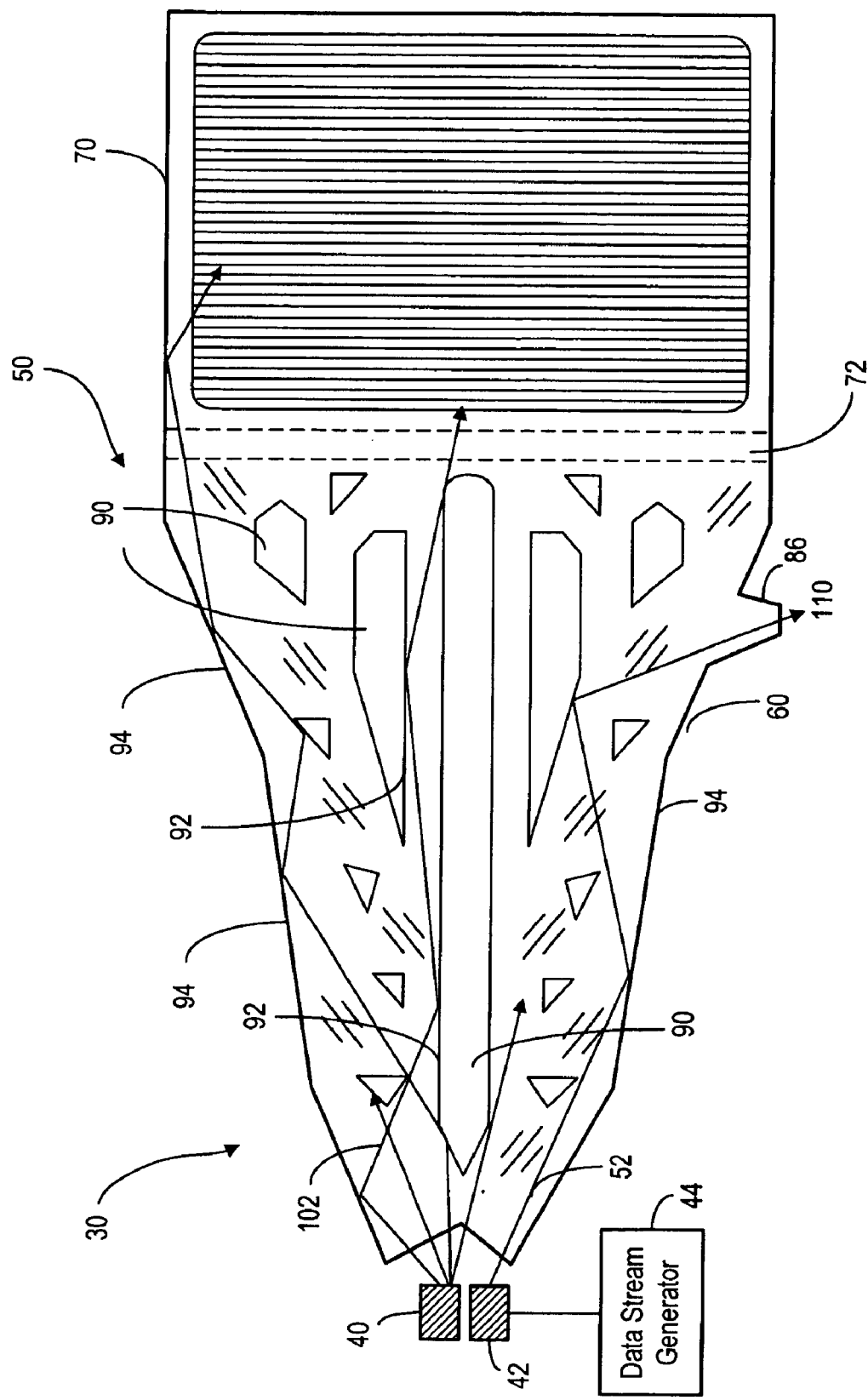
FIG. 14 is a top view showing a light conduit also being used to transmit data signals.

It should be noted that the light source 40 can also be used to illuminate one or more decorative parts 10' on the phone cover 5, as shown in FIG. 13. Furthermore, it is also possible to place an infrared LED 42, which is operatively connected to a data stream generator 44, adjacent to the light conduit 50, as shown in FIG. 14, so as to allow the mobile terminal 1 to transmit data from a transmission point 86 using infrared signals 110 via the light conduit 50 to an external device (not shown). The advantage of using the light conduit 50 is that it is not necessary to place the transmission point 86 near the infrared LED 42.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. An illumination system for use in a device having a plurality of key buttons disposed in a plurality of key locations, said illumination system comprising:
   a light source for providing light; and
   a light conduit adapted to receive at least a portion of the provided light, the light conduit having:
      a light guiding section for conveying the received light to areas near the key locations, wherein the light guiding section has two substantially flat boundaries and a plurality of side surfaces joining the two boundaries within the light guiding section for allowing the received light to propagate between the boundaries and side surfaces via reflection, and
      a plurality of light escape elements disposed in the light guiding section and located in the areas near the key locations to allow portions of the received light to escape from the light guiding section for illuminating the key buttons, wherein said light escape elements have a plurality of side facets, at least some of which reflect other portions of the received light along with one or more of the side surfaces within the light guiding section for allowing said other portions of the received light to propagate between the boundaries of the light guiding section.

2. The illumination system of claim 1, wherein the device further comprises a display, and the light conduit further comprises a light escapement section located near the display and extended from the light guiding section of the light conduit to allow a further portion of the received light to escape from the light escapement section for illuminating the display.

3. The illumination system of claim 1, wherein the device further comprises a display, said illumination system further comprising a light escapement member located near the display and optically coupled to the light guiding section of the light conduit for further conveying the received light to the light escapement member for illuminating the display.

4. The illumination system of claim 1, wherein the device further comprises a display, the light conduit further comprising a further light guiding section having a first end located near the light source for receiving said portion of the provided light and a second end optically coupled to the light guiding section for conveying a part of the received light to the light guiding section, wherein the further light guiding section has a plurality of further light escape elements disposed near the display to allow a further part of the received light to escape from the further light escape elements for illuminating the display.

5. The illumination system of claim 1, wherein the light source comprises a light-emitting diode.

6. The illumination system of claim 1, wherein the light source comprises a laser diode.

7. The illumination system of claim 1, wherein the light source comprises an optical fiber illumination device.

8. The illumination system of claim 1, wherein the light source comprises an incandescent lamp.

9. The illumination system of claim 1, wherein the light source comprises a fluorescent lamp.

10. The illumination system of claim 1, wherein the two boundaries are substantially parallel to each other.

11. The illumination system of claim 1, wherein at least one of the two boundaries is a dense-rare boundary.

12. The illumination system of claim 1, wherein the device further comprises a display, and the light conduit further comprises a light escapement section located near the display, and wherein the light guiding section has a first end located near the light source for receiving said portion of the provided light and a second end optically coupled to the light escapement section to allow a further portion of the received light to escape from the light escapement section for illuminating the display.

13. A light conduit for use in a device having a display, a plurality of key buttons disposed in a plurality of key locations and a light source for providing light, said light conduit adapted to receive at least a portion of the light provided by the light source, said light conduit comprising:

a light guiding section for conveying the received light to areas near the key locations, wherein the light guiding section has two substantially flat boundaries and a plurality of side surfaces joining the two boundaries within the light guiding section for allowing the received light to propagate between the boundaries and the side surfaces via reflection, and a plurality of light escape elements disposed in the light guiding section and located in the areas near the key locations to allow portions of the received light to escape from the light guiding section for illuminating the key buttons wherein said light escape elements have a plurality of side facets, at least some of which reflect other portions of the received light along with one or more of the side surfaces within the light guiding section for allowing said other portions of the received light to propagate between the boundaries of the light guiding section.

14. The light conduit of claim 13, further comprising a light escapement section located near the display and extended from the light guiding section to allow a further portion of the received light to escape from the light escapement section for illuminating the display.

15. The light conduit of claim 13, further comprising a light escapement section located near the display and optically coupled to the light guiding section to allow a further portion of the received light to escape from the light escapement section for illuminating the display.

16. The light conduit of claim 13, further comprising a further light guiding section having a first end located near the light source for receiving said portion of the provided light and a second end extended from the light guiding section for conveying a part of the received light to the light guiding section, wherein the further light guiding section has a plurality of further light escape elements disposed near the display to allow a further part of the received light to escape from the further light escape elements for illuminating the display.

17. The light conduit of claim 13, further comprising a further light guiding section having a first end located near the light source for receiving said portion of the provided light and a second end optically coupled to the light guiding section for conveying a part of the received light to the light guiding section, wherein the further light guiding section has a plurality of further light escape elements disposed near the display to allow a further part of the received light to escape from the further light escape elements for illuminating the display.

18. The light conduit of claim 13, wherein the two boundaries are substantially parallel to each other.

19. The light conduit of claim 13, wherein at least one of the two boundaries is a dense-rare boundary.

20. The light conduit of claim 13, wherein at least one of the light escape elements in the light guiding section is a multi-facet dent in one of the two boundaries.

21. The light conduit of claim 20, wherein the multi-facet dent has at least one reflection surface.

22. The light conduit of claim 20, wherein the multi-facet dent has at least one surface coated for reflection enhancement.

23. The light conduit of claim 13, wherein at least one of the light escape elements in the light guiding section comprises a plurality of micro-lenses.

24. The light conduit of claim 16, wherein the further light escape elements comprise step surfaces for reflection.

25. The light conduit of claim 17, wherein the further light escape elements comprise step surfaces for reflection.

26. The light conduit of claim 24, wherein the step surfaces comprise surfaces coated with a reflective material.

27. The light conduit of claim 25, wherein the step surfaces comprises surfaces coated with a reflection material.

28. A portable device comprising:

a display;

a plurality of key buttons disposed in a plurality of key locations;

a light source for providing light; and a light conduit adapted to received at least a portion of the provided light from the light source, the light conduit having:

a light guiding section for conveying the received light to areas near the key locations, wherein the light guiding section has two substantially flat boundaries and a plurality of side surfaces joining the two boundaries within the light guiding section for allowing the received light to propagate between the boundaries and the side surfaces via reflection, and a plurality of light escape elements disposed in the light guiding section and located in the areas near the key locations to allow portions of the received light to escape from the light guiding section for illuminating the key buttons, wherein said light escape elements have a plurality of side facets, at least some of which reflect other portions of the received light along with one or more of the side surfaces within the light guiding section for allowing said other portions of the received light to propagate between the boundaries of the light guiding section.

29. The portable device of claim 28, wherein the light conduit further comprises a light escapement section located near the display and extended from the light guiding section to allow a further portion of the received light to escape from the light escapement section for illuminating the display.

30. The portable device of claim 28, wherein the light conduit further comprises a light escapement section located near the display and optically coupled to the light guiding section to allow a further portion of the received light to escape from the light escapement section for illuminating the display.

31. The portable device of claim 28, wherein the light conduit further comprises a further light guiding section having a first end located near the light source for receiving said portion of the provided light and a second end optically coupled to the light guiding section for conveying a part of the received light to the light guiding section, wherein the further light guiding section has a plurality of further light escape elements disposed near the display to allow a further part of the received light to escape from the further light escape elements for illuminating the display.

32. The portable device of claim 28, comprising an electronic device.

33. The portable device of claim 28, comprising a telecommunications device.

34. The portable device of claim 28, comprising a mobile terminal.

35. The portable device of claim 28, further comprising a data stream generating device for generating data for communication with an external device, a further light source operatively connected to the data stream generating device for providing optical signals indicative of the data, and a data transmission point optically coupled to the light conduit, wherein the light conduit is further adapted to receive at least a portion of the optical signals for conveying at least a portion of the receive optical signals to the transmission point so as to allow the portable device to transmit the data via the optical signals to the external device.

36. The portable device of claim 35, wherein the further light source is an infrared light source.

* * * * *

UNITED STATES PATENT AND TRADEMARK OFFICE
CERTIFICATE OF CORRECTION

PATENT NO. : 6,874,926 B2
DATED : April 5, 2005
INVENTOR(S) : Nousiainen

It is certified that error appears in the above-identified patent and that said Letters Patent is hereby corrected as shown below:

<u>Title page,</u>
Item [57], ABSTRACT,
Lines 14 & 15, "light guide section or near the light escapement section." should be deleted.

Signed and Sealed this

Sixteenth Day of August, 2005

JON W. DUDAS
*Director of the United States Patent and Trademark Office*